United States Patent
Fujimaki et al.

[11] Patent Number: 6,097,467
[45] Date of Patent: Aug. 1, 2000

[54] LATITUDINAL LCD WITH CYLINDRICAL AND ELIPTICAL SPACERS AT INTERSECTION OF SIGNAL AND GATE LINES

[75] Inventors: Eriko Fujimaki; Yuji Yamamoto, both of Tokyo, Japan

[73] Assignee: NEC Corporation, Tokyo, Japan

[21] Appl. No.: 08/906,150

[22] Filed: Aug. 5, 1997

[30] Foreign Application Priority Data

Aug. 5, 1996 [JP] Japan ..................................... 8-205616

[51] Int. Cl.[7] .................................................. G02F 1/1339
[52] U.S. Cl. ............................................ 349/155; 349/141
[58] Field of Search .................................. 349/587, 155, 349/156, 139, 106, 50, 141

[56] References Cited

U.S. PATENT DOCUMENTS

| | | | |
|---|---|---|---|
| 4,470,667 | 9/1984 | Okubo et al. | 349/42 |
| 5,757,451 | 5/1998 | Miyazaki et al. | 349/155 |

FOREIGN PATENT DOCUMENTS

| | | |
|---|---|---|
| 3-127028 | 5/1991 | Japan . |
| 4-93924 | 3/1992 | Japan . |
| 4-122914 | 4/1992 | Japan . |
| 5-19267 | 1/1993 | Japan . |
| 6-160878 | 6/1994 | Japan . |
| 6-214244 | 8/1994 | Japan . |
| 7-134301 | 5/1995 | Japan . |
| 7-281195 | 10/1995 | Japan . |
| 9-73088 | 3/1997 | Japan . |

OTHER PUBLICATIONS

Tajima et al, "Hitachi Super TFT–LCD Offers 140 degree Viewing Angle ", Nikkei Electronics Asia, Mar. 1996.

*Primary Examiner*—Kenneth Parker
*Attorney, Agent, or Firm*—Young & Thompson

[57] ABSTRACT

Disclosed is a liquid crystal display device, for controlling liquid crystal by using a latitudinal electric field. Gate wires and drain wires, and switching devices at their intersections, are formed on a transparent active matrix substrate. Source electrodes connected to the switching devices and parallel common electrodes are also formed on the active matrix substrate. Liquid crystal is controlled by an electric field parallel to the surface of the active matrix substrate. By using the same material as are used for color filters, spacers having cylindrical, elliptical, or hemispherical shapes are formed on an opposing substrate at locations that correspond to the intersections of the gate wires and the drain wires.

7 Claims, 6 Drawing Sheets

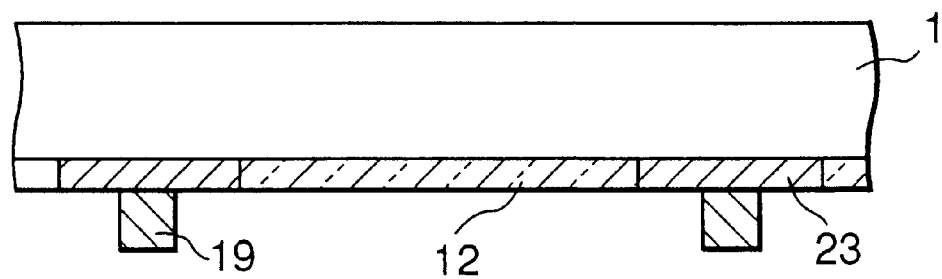
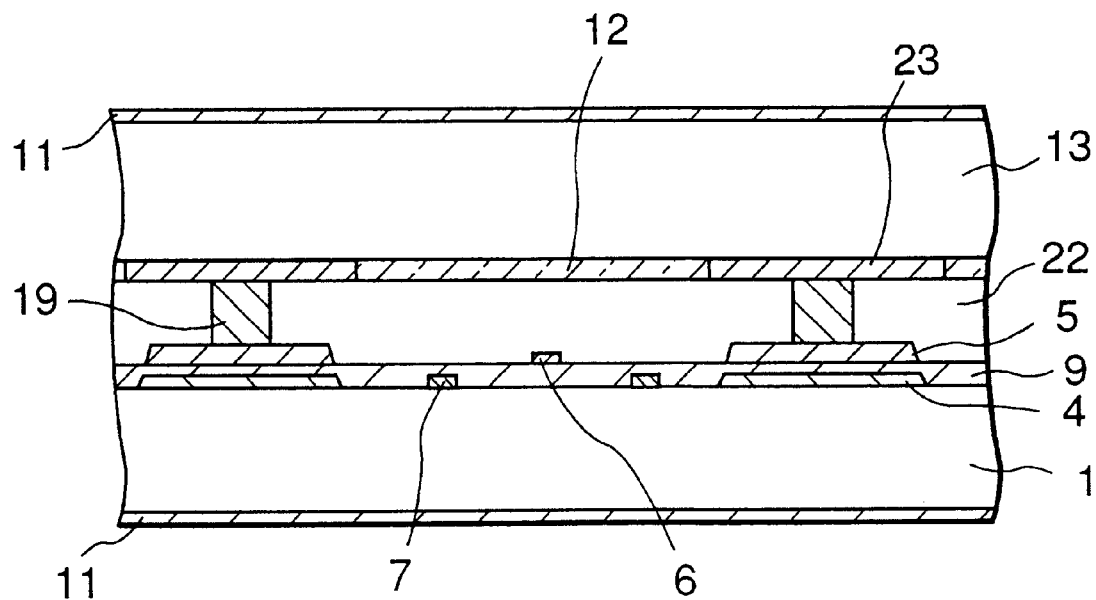

LATITUDINAL LCD WITH CYLINDRICAL AND ELIPTICAL SPACERS AT INTERSECTION OF SIGNAL AND GATE LINES

BACKGROUND OF THE INVENTION (1) Field of the Invention

The present invention relates to an active matrix liquid crystal display device, and in particular to the structure of a spacer for a liquid crystal display device of a latitudinal electric field type whereof the direction of an electric field to be applied to a liquid crystal parallels the phase boundary of a substrate.

(2) Description of the Related Arts

Conventionally, for a common active matrix liquid display device, a system (a longitudinal electric field type) is employed whereby a voltage is applied to two transparent substrates between which nematic liquid crystal is held, and the orientation of liquid crystal molecules is changed in consonance with the voltage applied to control the transmittance of light. The liquid crystal display device is constituted by an active matrix substrate, on which are formed a switching device and an electrode, and another substrate disposed opposite it, with liquid crystal sealed between these substrates and polarized plates located outside the substrates. When a voltage is applied to the electrodes formed on the substrate, the orientation of the liquid crystal molecules is altered and the transmittance of light is changed.

It is well known that the brightness of such a common liquid crystal display device changes because the optical activity of transmitted light varies, depending on the angle (the view field angle) at which a screen is viewed. For example, when a screen is positioned uptight and is viewed from the front, i.e., in the direction corresponding to the normal to surface line of the screen, an image having superior contrast is seen. However, when the screen is viewed from diagonally below the normal to surface direction, it is dark, and when it is viewed from further below, areas of contrasting brightness are inverted, i.e., a so-called gray scale inversion phenomenon occurs. Then, when the screen is viewed from diagonally above the normal to surface direction, it becomes whitish. These phenomena occur because the direction in which liquid crystals are aligned is determined by the display method, whereby optical activity is controlled by applying a longitudinal electric field (an electric field perpendicular to a substrate) to the liquid crystals and by aligning the liquid crystals in the direction of the electric field.

Recently, a latitudinal electric field display system has been drawing more attention as a system that can resolve the view field angle problem.

While a conventional liquid crystal display device controls the alignment of liquid crystals in the direction that runs parallel to a longitudinal electric field, which is perpendicular to a substrate, a latitudinal electric field display device controls the alignment of the liquid crystals in the direction of a latitudinal electric field that runs parallel to the substrate. Since in principle this system provides a wide view field angle and changes color tones only a little, it is considered to be the most effective, an improved system. As the latitudinal electric field display device is described in detail in Japanese Unexamined Patent Publication No. Hei 6-160878, no explanation for it will be given here.

Although compared with the longitudinal electric field type the latitudinal electric field liquid crystal display device has a wider view field angle, it requires light shielding portions, such as common electrodes, source electrodes and switching devices, and its pixel opening rate is slower than that of the longitudinal electric field display device. Multiple spacer particles are dispersed in order to form a cell gap, which affects the display characteristics of the latitudinal electric field type more than those of the longitudinal type.

Thus, a latitudinal electric field liquid crystal display device that does not employ spacer particles is disclosed in Japanese Unexamined Patent Publication No. Hei 6-214244. Since this liquid crystal display device is so designed that both a common electrode and a pixel electrode (a source electrode) are formed perpendicular to a substrate and are employed as spacers (struts), it does not require spacer particles.

For this liquid crystal display device, however, since it is difficult to form electrodes corresponding to a cell gap on a substrate and to perform a rubbing process on an alignment film formed on the surface of the substrate, devising such a display device is difficult.

A longitudinal electric field liquid crystal display device that requires no dispersion of spacer particles has been disclosed. In Japanese Unexamined Patent Publication No. Hei 7-281195, for example, is disclosed a liquid crystal display device wherein protrusions are formed on both an active matrix substrate and a substrate on which a color filter is formed, and the protrusions are brought into contact with each other to serve as spacer struts. This display device will be described while referring to included drawings. FIG. 8A is a plan view of the structure of one pixel of the liquid crystal display device, and FIG. 8B is a cross-sectional view taken along line VIIIB—VIIIB in FIG. 8A.

Gate wires 4 and drain wires 5 are formed on a transparent substrate 1 so that they intersect each other, and a switching device 8 using a thin film transistor (called a TFT) is arranged near each intersection. In the switching device 8, a gate insulating film 9 and a semiconductor layer 10 are overlaid on the gate wire 4, and the drain wire 5 and a source electrode 6 are formed via the semiconductor layer 10. Light shielding film 15 is laminated to form a protrusion on the thin film transistor, which serves as the switching device 8. Color filter material 16, 17 and 18 for three primary colors, R, G and B, are laminated to form another protrusion on a substrate, which serves as a color filter. An alignment film 20 is formed on each protrusion and a rubbing process is performed for the protrusions. Then, the substrates are overlapped so that contact is made with the protrusions and a cell gap is formed.

A film formation procedure is performed after a thin-film transistor is formed in order to form a thick light shield film on the thin film transistor. During this procedure, however, some deterioration of the characteristics of the thin film transistor occurs.

In addition, since spacer struts are located on the thin film transistor, external pressure is exerted on the thin film transistor, and this will adversely affect the transistor characteristics.

Another problem also arises. The shaded portions in FIG. 8A are display disabled areas, where light is shielded, and the non-shaded areas are display enabled areas. As is shown in FIG. 8A, the spacer struts on the thin-film transistor are located near display enabled areas, so that during the rubbing process, parts of the display areas are hidden by the spacer struts and can not be rubbed, which can precipitate display failures.

SUMMARY OF THE INVENTION

To resolve the above problems, it is one object of the present invention to provide, without requiring the performance of a special manufacturing procedure, a liquid crystal display device of a latitudinal electric field type that can prevent a transistor characteristic from being adversely affected and the occurrence of rubbing failures, suppress the deterioration of a display characteristic due to uneven alignment of liquid crystals and light leakage, and accurately maintain a constant panel gap.

In a liquid crystal display device of a latitudinal electric field type according to the present invention, a spacer strut is formed on at least one of two facing substrates, with the location of the spacer strut corresponding to an intersection of a gate wire and a drain wire in an area that is not opposite a switching device.

When the latitudinal electric field liquid crystal display device is applied in a color liquid crystal display device having a color filter, it is preferable that a color filter be used as spacer strut material.

In particular, according to the present invention, a color liquid crystal display device of a latitudinal electric field type comprises: a first transparent substrate on which are gate wires, drain wires, with switching devices being formed near each intersection of the gate wires and the drain wires, source electrodes connected to the switching devices, and common electrodes, each of which has at least one part that is almost parallel to the source electrode; a second substrate disposed opposite the first substrate via liquid crystal, the liquid crystal being sandwiched between the first and the second substrates and being controlled by an electric field that is parallel to the first substrate; and spacers formed on the first and the second substrates, which correspond to intersections of the gate wires and the drain wires near the switching devices, so as to maintain a constant height for the substrates.

It is preferable that the spacers have cylindrical or hemispherical shapes, or more preferably, that the spacers have elliptical shapes with their longer axes extending in a rubbing direction.

In the liquid crystal display device of the present invention, spacer struts are located in portions wherein the display is not adversely affected, i.e., locations wherein liquid crystal is inappropriately aligned because of uneven rubbing and does not reach an opening. In other words, the present invention utilizes the low pixel opening rate. The areas where the alignment of the liquid crystal is inappropriate because of uneven rubbing are related to the rubbing direction. When liquid crystal having an anisotropic positive dielectric constant is employed, the angle formed by the rubbing direction and the longitudinal direction of an electrode ranges from 0° to 40°. This angle determines the direction in which liquid crystal is rotated by the electric field, and the range of 0° to 40° is appropriate. Since an area that is not rubbed tends to be a portion that is hidden by a protrusion, it is preferable that such a portion be shielded from light. In a liquid crystal display device of a latitudinal electric field type, the drain wires, the switching devices and the gate wires are shielded from light to prevent the deterioration of display due to an irregular electric field on the wire and at the switching device. If a spacer strut is arranged at the intersection of a gate and a drain, a large portion that is hidden by the spacer strut is shielded from light, and the display portion is not adversely affected. That is, while large pixel electrodes are formed for the common longitudinal electric field type, and large light shielded areas are limited to the switching devices only, the latitudinal electric field type acquires large light shielded portions because of its electrode structure. In addition, the areas where liquid crystal alignment is inappropriate because of the failure of a rubbing process can be limited to the light shielded portions.

Since the protrusions that act as spacers are formed with cylindrical, hemispherical or elliptical shapes, the friction accompanying rubbing can be reduced and the occurrence of failures caused by the rubbing process can be reduced. Thus, areas of inappropriate alignment of liquid crystal are reduced, and a reliable liquid crystal display device having superior display characteristics can be provided.

In addition, since the protrusions, which are spacers, are formed on the light shielded portions, unlike the conventional case where spacer particles are employed, inappropriate alignment of liquid crystal due to spacer particles and point defects do not occur, and there is no deterioration of the contrast ratio.

Further, since the spacers are formed of color filter material, a uniform spacer density can be acquired and a constant panel gap that is accurately maintained can be provided.

Furthermore, since a procedure for distributing spacer material is not required, the yield for the liquid crystal display device can be improved and fabrication costs can be reduced.

BRIEF DESCRIPTION OF THE DRAWINGS

FIG. 1A is a cross-sectional view of one part of a color filter substrate according to the present invention;

FIG. 1B is a cross-sectional view of one part of a liquid crystal display device of a latitudinal electric field type;

DETAILED DESCRIPTION OF THE PREFERRED EMBODIMENTS

Figure 2:
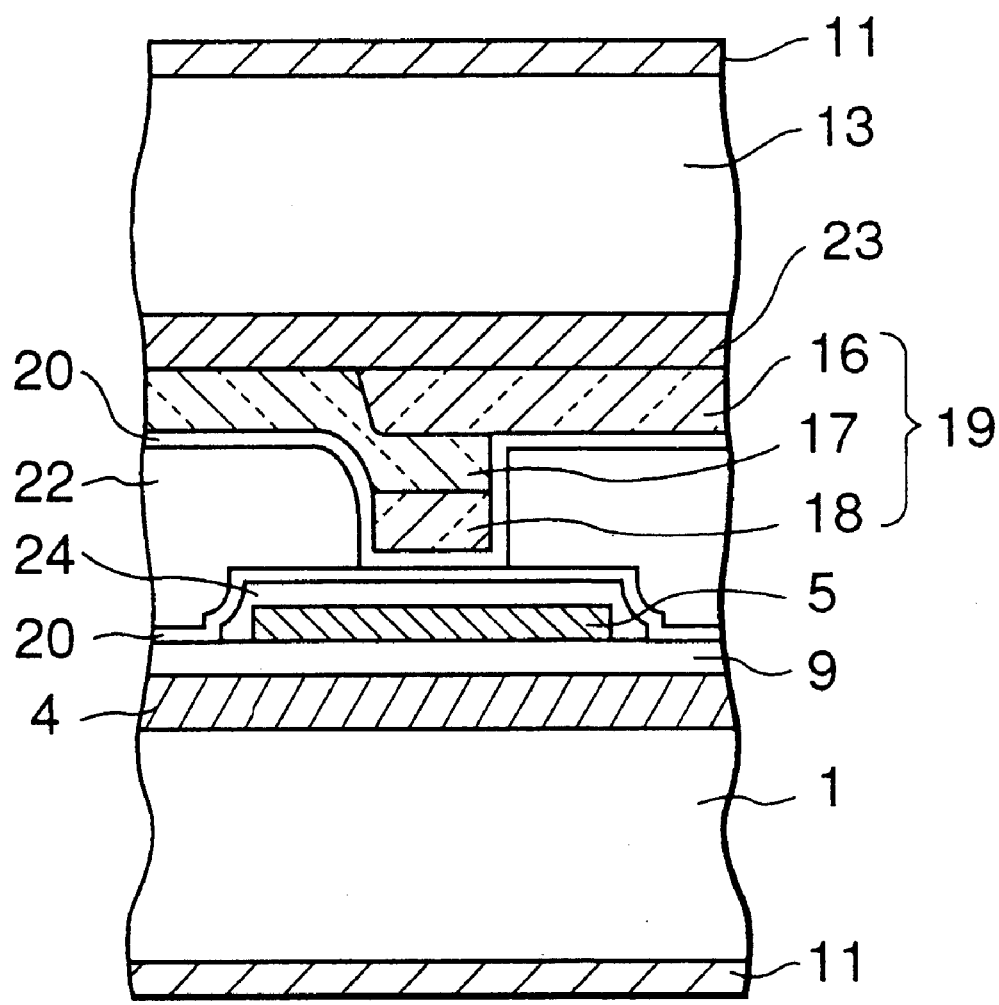
FIG. 2 is a cross-sectional view of a spacer structure according to a first embodiment of the present invention.

The preferred embodiments of the present invention will now be described while referring to the accompanying drawings.

FIGS. 1A and 1B are schematic cross-sectional views of an example structure of a liquid crystal display device of a latitudinal electric field type according to the present invention.

FIG. 1A is a cross-sectional view of a color filter substrate on which spacers are mounted. Spacers 19, cylindrical protrusions of color filter material, are formed on a light shielding film. FIG. 1B is a cross-sectional view of joined upper and lower substrates. A substrate 13, on which a thin film transistor is formed, and a substrate 1, on which a color filter 12 and the spacers 19, are joined together, and liquid crystal is introduced between the substrates to form a panel. The spacers 19 are formed on light shielded portions of the substrate 13 that correspond to intersections of gate wires 4 and drain wires 5. The interval between the substrates is determined mainly by the total of the heights of the spacers 19 and of the drain wires 5, a gate insulating film 9 and the gate wires 4 on the active matrix substrate.

In FIG. 2 is shown a liquid crystal display device of a latitudinal electric field type, according to another embodiment of the present invention. The liquid crystal display device comprises a transparent substrate 1, on which gate wires and drain wires are so formed that they intersect each other; a substrate 13, on which a color filter is formed; a liquid crystal layer 22, sandwiched between the substrates 1 and 13; and polarization plates 11, laminated on the external surfaces of the substrates 1 and 13.

Figure 3:
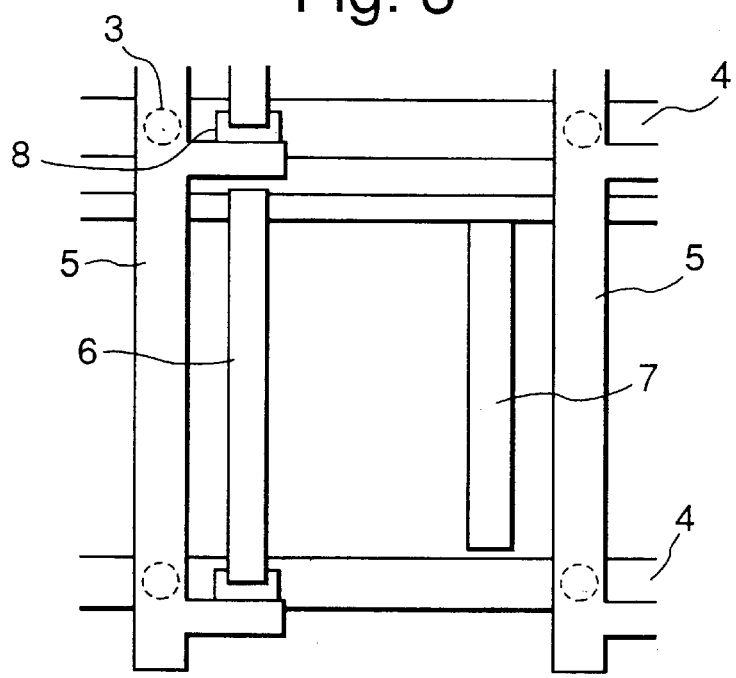
FIG. 3 is a partial plan view of an active matrix substrate of a liquid crystal display device according to the first embodiment of the present invention.

FIG. 3 is a plan view of the structure of the wiring for one pixel on the transparent substrate 1. The gate wires 4 and the drain wires 5 are arranged perpendicular to each other on the transparent substrate 1, and switching devices 8 are arranged at their intersections. An area enclosed by gate wires 4 and drain wires 5 is defined as one pixel, and a common electrode 7 and a source electrode 6 are formed in parallel in this area on the said substrate.

The structure of the switching device 8 is the same as that for the thin-film transistor described for the prior art.

At the intersections of the gate wires 4 and the drain wires 5, the gate wires 4 are located on a glass substrate, and the drain wires 5 are located on the gate insulating film that is deposited across almost the entire surface of the resultant structure.

Referring back to FIG. 2, on its lower surface the substrate 13 has color filters 16, 17 and 18, with R, G and B layers being formed at respective locations that correspond to predetermined pixel opening portions. A light shielding film 23 made of a resin is formed on the substrate 13 that is opposite the gate wire 4 and the switching device 8 on the active matrix substrate. The polarization plate 11 is bonded to the upper surface of the substrate 13. The polarization plates 11 are so-called cross-Nicol arranged, so that the transmission axes of the polarization plates intersect. The transmission axis of the lower polarization plate is positioned at an predetermined angle so that it matches the direction in which liquid crystals are aligned, while the transmission axis of the upper polarization plate is positioned so that it intersects the transmission axis of the lower polarization plate.

A color filter 16 for the first color (formed first), a color filter 17 for the second color (formed second), and a color filter 18 for the third color (formed third) constitutes a spacer 19. The spacer 19 is formed at a location on the light shielding film 23 on the substrate 13 that corresponds to the intersection of the gate wire 4 and the drain wire 5. Spacer contact portions 3 in FIG. 3 designate the locations of the spaces 19 whereat the gate wire 4 and the drain wire 5 intersect. Although the spacer contact portions 3 are depicted as circles in the plan view, three-dimensionally, the spacer 19 has a cylindrical shape.

Figure 4:
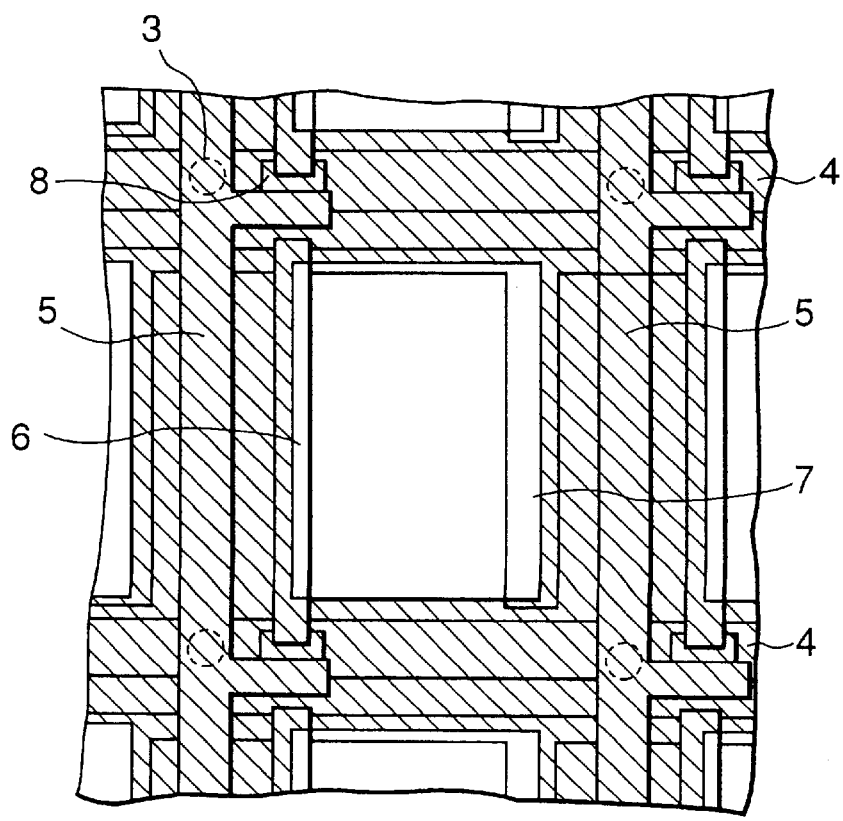
FIG. 4 is a partial plan view, viewed from a color filter side, of the liquid crystal display device according to the first embodiment of the present invention.

FIG. 4 is a diagram showing the liquid crystal display device, according to the embodiment of the present invention, viewed from the substrate 13 side. Since the spacer contact portions 3 are arranged at the intersections of the gate wires 4 and the drain wires 5, they are the farthest from a display area (unshaded portions). In addition, as this display device is a latitudinal electric field type, a long distance between the display area and the spacer struts can be provided.

The structure of the display device of the embodiment will now be explained by using specific values. First, the size of the spacers 19 will be described. Since the first color filter (R) 16, the second color filter (G) 17 and the third color filter (B) 18 are all 1.2 $\mu$m thick, the resultant protrusion is 3.6 $\mu$m high. The thicknesses of the gate wires 4, the gate insulating film 9, the drain wires 5 and a protective film 24 and an alignment film 20, which are 0.1 $\mu$m, 0.3 $\mu$m, 0.1 $\mu$m, 0.2 $\mu$m and 0.1 $\mu$m respectively, are added to the protrusion height, and the total thickness defines a panel gap. In this example, the panel gap is is 4.4 $\mu$m. The spacers 19 are cylindrical, and their diameters are about 10 $\mu$m, smaller than the smallest widths of the gate wires 4 or of the drain wires 5.

An explanation will be given for the fabrication method for a liquid crystal display device according to the present invention. First, the method for fabricating an active matrix substrate will be described.

A chrome film is formed on a transparent glass substrate by the sputtering, and a gate wire and a common electrode are patterned by photolithography. Then, a gate insulating film made of nitrogen silicon and an amorphous silicon (a—Si) film are overlaid by the CVD method. A drain wire of chrome and a source electrode are formed by sputtering and photolithography so that they cover one part of the a—Si film and form a thin film transistor, and then a protective insulating film of silicon nitride is formed thereon. An alignment film is formed on the resultant structure, and an alignment process is performed by rubbing in the direction that forms an angle of 15° with the longitudinal direction of the source electrode.

The method for fabricating an opposing substrate will now be described.

A photosensitive polymer containing carbon is deposited on a transparent glass substrate and a light shielding film is formed by photolithography, and then color filters are formed. To form red filters, a photosensitive polymer containing red pigment is deposited on the substrate, and then, photolithography is used to remove the polymer from all areas other than those locations at which red filters are desired. The same process is performed to form green filters and blue filters. When the color filters have been formed on the substrate, spacers are provided by overlaying the first red filter, the second green filter, and the third blue filter on the parts of the light shielding film in the named order. As is described above, the spacers are located on the light shielding film of the opposing substrate at locations that correspond to the intersections of the gate wires and the drain wires.

After the alignment film is deposited on the glass substrate on which the color filters are formed and the alignment process is performed, the two substrates are disposed facing each other, so that their alignment directions are parallel. The peripheral edges of the two substrates are sealed with resin, and thereafter, a liquid crystal panel is fabricated. A nematic liquid crystal compound, which has an anisotropic dielectric constant of 4.5 and a birefringence Δn of 0.080, is introduced, an injection hole is closed, and polarization plates are bonded to the two substrates. As a result, a liquid crystal display device can be provided that has a mode (normally black) wherein light is not transmitted when no voltage is applied.

The processing of the liquid crystal display device of the present invention will now be described. Since in a conventional liquid crystal display device, high protrusions that serve as spacers are provided near display areas on the substrate on which a color filter is formed, or on the active matrix substrate, there are areas around the spacers that are not rubbed, and deterioration of the display characteristics occurs. In the liquid crystal display device in this embodiment, however, a large portion, at an intersection of the gate and the drain, that is hidden by a cylindrical protrusion, which is formed at the intersection to reduce friction during rubbing, is shielded in the rubbing direction from light. Therefore, the size of the area that is not rubbed is decreased, and the adverse affect on a pixel opening, i.e., the deterioration of the display characteristics, does not occur.

Figure 5:
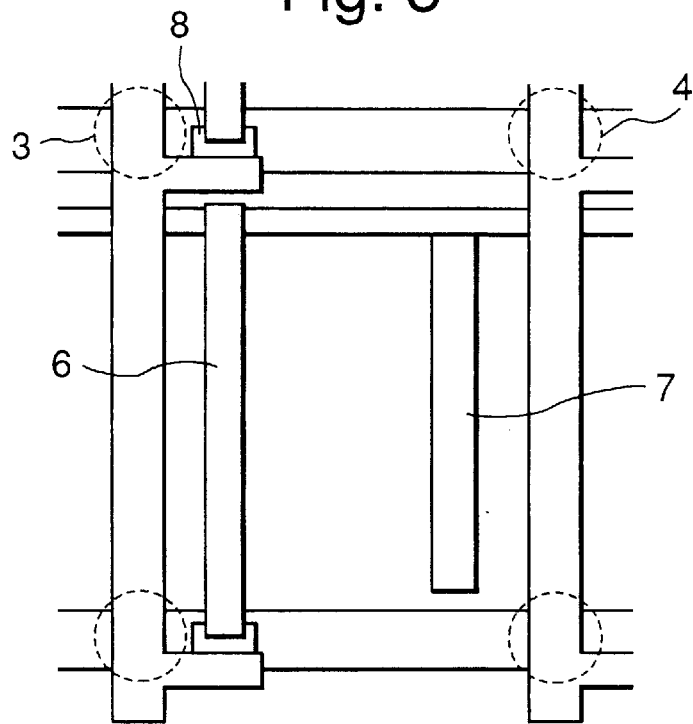
FIG. 5 is a partial plan view, of an active matrix substrate, for explaining a spacer contact portion according to a second embodiment of the present invention.
Figure 6:
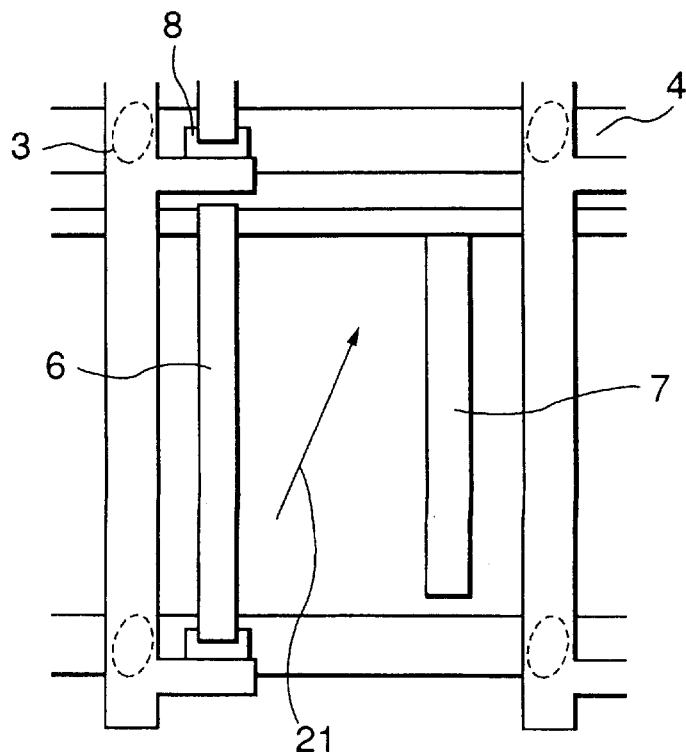
FIG. 6 is a partial plan view, of an active matrix substrate, for explaining a spacer contact portion according to a third embodiment of the present invention.

In addition, since protrusions that constitute spacers have cylindrical shapes, attachment of waste material generated during the rubbing process can be prevented. Therefore, the deterioration of the alignment of the liquid crystals due to the attachment of the waste material does not occur, and afterimages, which persist for a long time when contamination due to the waste material is present, can be prevented. If no failure due to rubbing occurs, the area employed for a spacer may be extended until it exceeds in size the width of the gate wire 4 or the drain wire 5, as is shown in FIG. 5 (second embodiment). A spacer may also have an elliptical shape, with the longer axis of the ellipse corresponding to the rubbing direction, as is shown in FIG. 6 (third embodiment), to reduce friction during the rubbing process.

Further, since in a pixel area there are no transparent spherical spacers that cause deterioration of the alignment of liquid crystals and light leakage, or that cause light leakage or point defects, reduction in the black level or the loss of contrast does not occur.

Furthermore, since the spacers are formed of color filter material, a uniform spacer density can be provided, and the thickness of a panel can be accurately maintained. In this way, an accurate panel gap can be provided.

Moreover, since the protrusions that constitute spacers are formed as color filters, special procedures for forming resin spacers to define a cell gap and a complicated procedure for the dispersion of spacers are not required, and the number of procedures employed is smaller than that which is conventionally required. Therefore, the yield for the liquid crystal display device can be improved and fabrication costs can be reduced.

Instead of the thin film transistor, a two-terminal device (MIM, etc.) may be used as the switching device.

Figure 7:
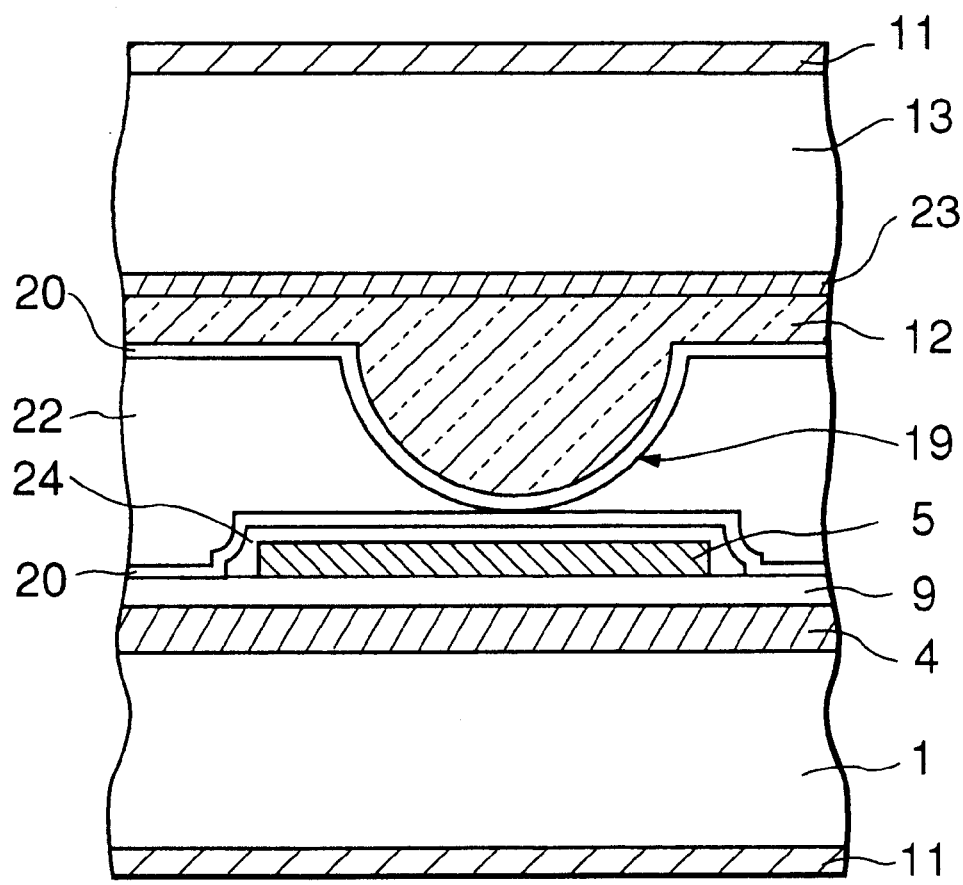
FIG. 7 is a cross sectional view of a spacer structure according to a fourth embodiment of the present invention.
Figure 8A:
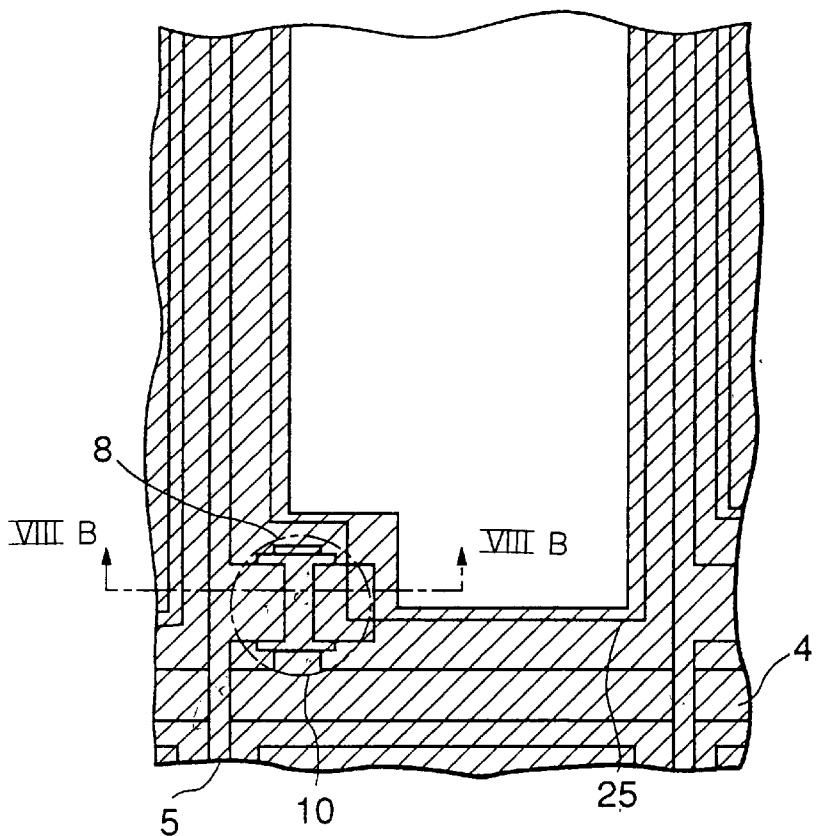
FIG. 8A is a partial plan view of an active matrix substrate of a conventional liquid display device of a longitudinal electric field type.
Figure 8B:
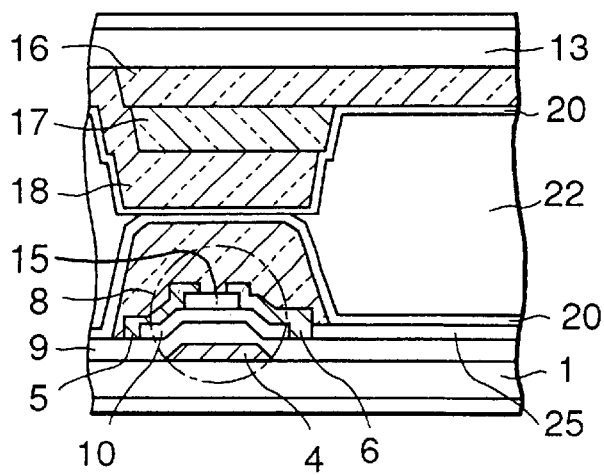
FIG. 8B is a cross sectional view taken along line VIIIB—VIIIB in FIG. 8A.

FIG. 7 is a cross-sectional view of a liquid crystal display device according to a fourth embodiment of the present invention. The liquid crystal display device is fabricated in the above described manner, except that in this embodiment a spacer having a hemispherical shape is formed on an opposing substrate.

The method for fabricating an opposing substrate will now be described.

Chrome is deposited on a transparent glass substrate by sputtering, and a light shielding film 23 and color filters 12 are formed. Red color filters 12 are provided by forming a dry film of photosensitive polymer containing red pigment that is bonded to the substrate at predetermined positions. Spacers 19 can be provided by forming convex portions or concave portions at predetermined positions when the film of photosensitive polymer that contains pigment is deposited. As was previously described, the spacers 19 are located on the light shielding film of the opposing substrate at positions that correspond to the intersections of gate wires 4 and drain wires 5. The same process is employed to form green filters and blue filters.

When a thus obtained liquid crystal display device was driven, no uneven display such as occurs when conventional transparent spherical spacers are used was observed, and a uniform display was obtained. This occurred because there was no light leakage and there were no point defects caused by spacer material. The contrast ratio was 1:15, which is satisfactorily high.

In this embodiment, since the protrusions of the spacers are hemispherical, almost no waste is generated by friction during rubbing, and the entire substrate can be rubbed. In addition, the spacers can be easily formed at desired locations, and a constant interval between the panels can be precisely maintained. Since the interval between the panels in a screen is almost constant and the spacer material is formed on the light shielding portion, a high quality display image with no unevenness can be obtained.

It should be noted that the spacers may be formed of individual color filters or only of red color filters. Furthermore, the color filters may be coated with a protective film made of organic or inorganic material.

According to the present invention, since cylindrical, hemispherical, or elliptical spacers are formed in specific light shielding portions on a substrate on which color filters are formed, large portions, which are covered by the protrusions in the rubbing direction, are shielded from light, and the display characteristics of the pixel openings are not deteriorated. In addition, since less friction is caused during the rubbing, there are no areas that are not rubbed, and the attachment of waste material, which is generated during the rubbing process, can be prevented.

Further, since in pixel areas transparent spherical spacers are not present that cause deterioration of the alignment of liquid crystals and light leakage, or that cause light leakage or point defects, reduction of the black level or the loss of contrast does not occur.

Furthermore, the constant inverval between the substrates can be precisely maintained, and a high quality display image with no unevenness can be obtained. Also, since the procedure for dispersing spacers is not required, the yield for the liquid crystal display device can be improved and the fabrication costs can be reduced.

What is claimed is:

1. A liquid crystal display device of a latitudinal electric field type comprising:

a first transparent substrate having thereon gate wires, drain wires, switching devices near each intersection of said gate wires and said drain wires, source electrodes connected to said switching devices, and common electrodes, each of which has at least one part that is almost parallel to said source electrode;

liquid crystal material between said first transparent substrate and a second substrate opposite said first substrate; and plural cylindrically shaped spacers on one of said first and second substrates that maintain a constant distance between said first substrate and said second substrate, said spacers being located to correspond to intersections of said gate wires and said drain wires near said switching devices.

2. The device of claim 1, wherein said spacers are at said intersections, and wherein said intersections are spaced from said switching devices.

3. A liquid crystal display device of a latitudinal electric field type comprising:

a first transparent substrate having thereon gate wires, drain wires, switching devices near each intersection of said gate wires and said drain wires, source electrodes connected to said switching devices, and common electrodes, each of which has at least one part that is almost parallel to said source electrode;

liquid crystal material between said first transparent substrate and a second substrate opposite said first substrate; and plural hemispherically shaped spacers on one of said first and second substrates that maintain a constant distance between said first substrate and said second substrate, said spacers being located to correspond to intersections of said gate wires and said drain wires near said switching devices.

4. The device of claim 3, wherein said spacers are at said intersections, and wherein said intersections are spaced from said switching devices.

5. A liquid crystal display device of a latitudinal electric field type comprising:

a first transparent substrate having thereon gate wires, drain wires, switching devices near each intersection of said gate wires and said drain wires, source electrodes connected to said switching devices, and common electrodes, each of which has at least one part that is almost parallel to said source electrode;

liquid crystal material between said first transparent substrate and a second substrate opposite said first substrate; and plural spacers on one of said first and second substrates that maintain a constant distance between said first substrate and said second substrate, said spacers being located to correspond to intersections of said gate wires and said drain wires near said switching devices, wherein said spacers have elliptical shapes whose major axes are oriented in a direction corresponding to a substrate rubbing direction.

6. The device of claim 5, wherein said spacers are at said intersections, and wherein said intersections are spaced from said switching devices.

7. A liquid crystal display device of a latitudinal electric field type comprising:

a first transparent substrate having thereon gate wires, drain wires, switching devices near each intersection of said gate wires and said drain wires, source electrodes connected to said switching devices, and common electrodes, each of which has at least one part that is almost parallel to said source electrode;

liquid crystal material between said first transparent substrate and a second substrate opposite said first substrate; and plural spacers on one of said first and second sub strates that maintain a constant distance between said first substrate and said second substrate, said spacers being located to correspond to intersections of said gate wires and said drain wires, and wherein at least one part of each of said spacers is both on one of said gate wires and on one of said drain wires and is not on one of said switching devices, wherein an entirety of each of said spacers is both on said gate wires and on said drain wires.

* * * * *